S. M. FRIEDE & W. B. HUTCHINSON.
MATCH MACHINE.
APPLICATION FILED DEC. 20, 1916.

1,240,837.

Patented Sept. 25, 1917.
2 SHEETS—SHEET 1.

Inventors.
Samuel M. Friede,
and Warren B. Hutchinson,
By their Attorney
W. P. Hutchinson, S. M. FRIEDE & W. B. HUTCHINSON.
MATCH MACHINE.
APPLICATION FILED DEC. 20, 1916.
1,240,837.
Patented Sept. 25, 1917.
2 SHEETS—SHEET 2.
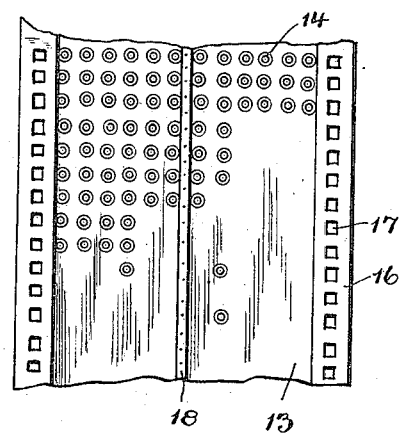
Fig. 4
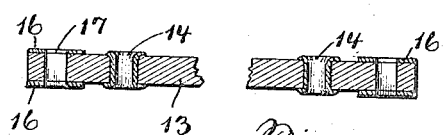
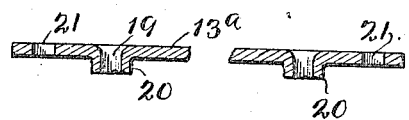
Fig. 5
Fig. 6
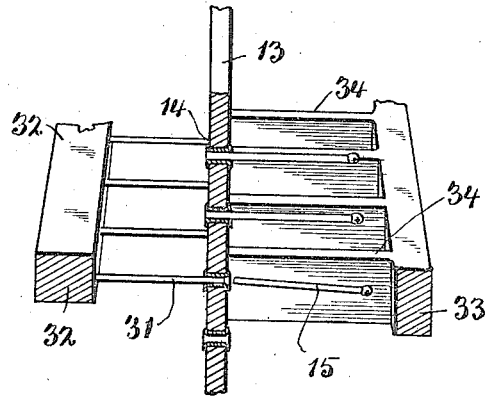
Fig. 7
Samuel M. Friede, and    Inventors.
Warren P. Hutchinson.
By their Attorney.
W. P. Hutchinson.

UNITED STATES PATENT OFFICE.

SAMUEL M. FRIEDE, OF NEW YORK, N. Y., AND WARREN B. HUTCHINSON, OF NEWARK, NEW JERSEY, ASSIGNORS TO H. & F. MATCH MACHINE CORPORATION, OF NEW YORK, N. Y., A CORPORATION OF NEW YORK.

MATCH-MACHINE.

1,240,837.  Specification of Letters Patent.  Patented Sept. 25, 1917.

Application filed December 20, 1916. Serial No. 137,947.

*To all whom it may concern:*

Be it known that we, SAMUEL M. FRIEDE, a citizen of the United States, and a resident of the city, county, and State of New York, and WARREN B. HUTCHINSON, a citizen of the United States, and a resident of the city of Newark, county of Essex, and State of New Jersey, have invented a new and useful Improvement in Match-Machines, of which the following is a full, clear, and exact description.

Our invention relates to improvements in continuous match machines, and the object of our invention is to produce a cheap, simple and efficient machine for making matches, which will lend itself to conveniently packing the matches in boxes or trays as they are ejected from the carrier. Our invention relates more particularly to the carrier and the ejecting and boxing mechanism. Continuous match machines in commercial practice are most frequently made with an endless carrier in which the match sticks are placed endwise in parallel relation for dipping, and this carrier is generally in the form of a series of plates hinged together in an endless chain, and mechanism for stepping the carrier along so that the splints can be properly inserted and carried to the several heating, paraffining and dipping attachments, and then carried for a sufficient space to cause the match heads to dry before they are ejected. The expensive part of the match machine is this carrier, because the plates have to be accurately bored, the joints have to be accurately made, the means for moving the plate must be of the nicest character, and moreover a long cumbersome and expensive frame is generally employed to support the carrier. There is also a large demand for cheap machines which do not have a very large capacity, and the type of continuous machine generally made does not lend itself to this construction. Our invention contemplates using a jointless belt for a carrier, providing the belt with holes to receive the match sticks, driving the belt by sprocket wheels which engage the belt preferably at the edges, and which serve to position the belt so that the match sticks can be readily inserted and the matches as easily ejected. By having a carrier of this type no supporting frame is necessary, as the belt can be carried along suitable guide pulleys or sprocket wheels which can be hung on any suitable hangers and disposed at the most convenient points, the only thing necessary being to have them in alinement so that the belt will run true. It will be seen that by having a jointless flexible belt, all expense of making plates and of mechanism for adjusting the feed as the plates succeed each other, is avoided, and this same principle applies to other forms of match holding devices which are arranged in an endless carrier. The above and other advantages will appear clearly from the description which follows.

Reference is to be had to the accompanying drawings forming a part of this specification, in which similar reference characters indicate corresponding parts in all the views.

Fig. 4 is a detail of the carrier in its preferred form.

Fig. 5 is a broken detail cross section of the carrier.

Fig. 6 is a detail cross section of a modified form of carrier, and

Fig. 7 is a broken sectional perspective of a means for ejecting the matches.

Figure 1:
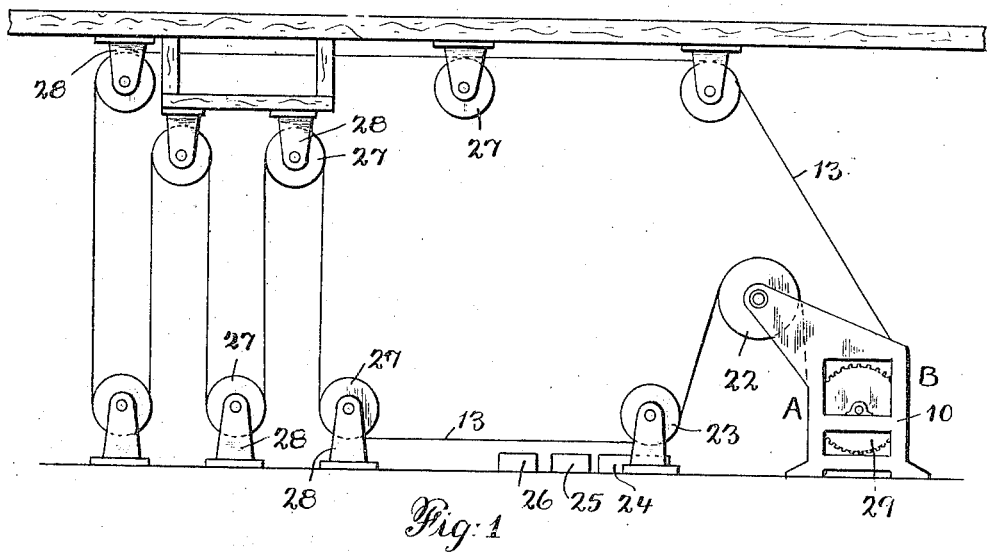
Figure 1 is a diagrammatic side elevation of a machine showing our improvements.

The frame 10 of any suitable design, comprises the greater part of the framework of the machine, and is only sufficient to accommodate the stations A and B in which the match sticks are respectively inserted and the matches ejected. These arrangements are not shown in detail because they can be of any approved type, and our invention does not lie in this part of the machine. We have shown, however, a conventional arrangement for sticking the splints, in which a grooved plate 11 is arranged opposite a vertical part of the carrier 13, and plungers 12 move through the grooves of the plate and insert the match sticks. However, this might be any other preferred form of sticking arrangement.

An important part of the invention, however, is the carrier itself. The carrier is a flexible belt 13 which can be of leather, rubber, canvas, or any suitable material, and it is provided with numerous holes 14 arranged in rows, and preferably in the form of eyelets as shown clearly in Fig. 5, which receive the match sticks 15. Means must be provided to carry the belt, so that it can be stepped along so as to advance the carrier one row of holes at a time in any usual or preferred way. If a belt of the character specified is used, it is preferably provided near the edges and on opposite sides with thin flexible plates 16, and holes 17 for the teeth of the sprocket wheels which drive it. These holes should aline with the transverse rows of holes 14 so that when the sprocket wheels hereinafter referred to are at rest, the sprocket wheels will serve to hold the carrier steady for the insertion of a row of splints. To prevent the belt from stretching it can be provided at necessary points on both surfaces with thin metallic strips 18 (see Fig. 4) which can be riveted together through the belt. If preferred a belt 13$^a$ of thin sheet flexible metal can be used instead of the belt shown in Fig. 5, in which case the splint holes 19 can be produced by punching through the metal as shown at 20, and the holes 21 can be made near the edge to engage the teeth of the sprocket wheel which drives the belt.

Referring to Fig. 1 we have shown diagrammatically the carrier 13 passing from the station A over guide sprockets 22, thence beneath the guide sprockets 23 to the parts 24, 25 and 26, which represent diagrammatically suitable devices for heating, paraffining and dipping the match sticks, and from thence the belt leads over guide pulleys or sprocket wheels 27 which can be supported at any desired points on hangers 28, and the carrier leads back opposite the discharge station B. It will be seen that no frame is necessary for the carrier, and that this leaves the machine adapted for easy installation in a room of almost any dimensions, as the hangers 28 and guide sprockets 27 can be located in the most convenient points. The belt can be carried conveniently by sprocket wheels 29 which can be located in the frame 10 and secured to a driving shaft 30. This can be driven in a step by step movement in any suitable manner. It will be noticed that as the sprocket wheels are stepped along they will bring successive rows of holes 14 into position to be filled, and they will also bring a successive row of holes into position to have the matches ejected.

Figure 2:
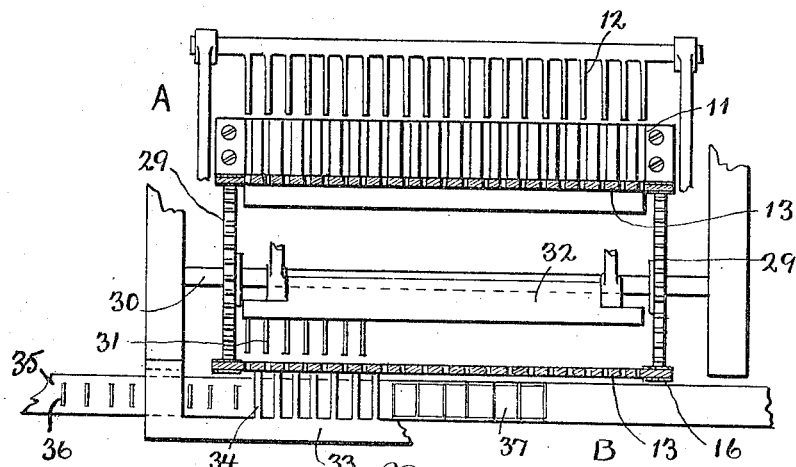
Fig. 2 is a sectional plan through the feeding and ejecting stations, showing the general arrangement of the mechanism for feeding and ejecting these sticks and matches.
Figure 3:
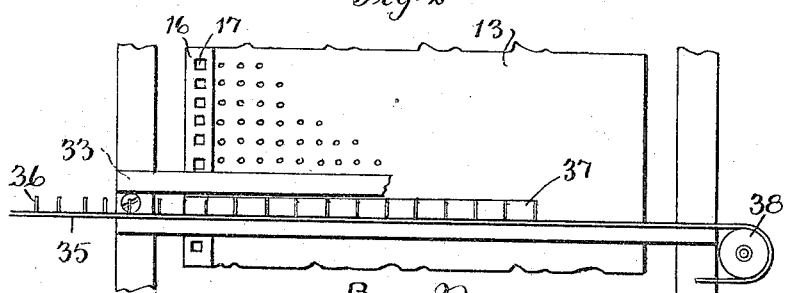
Fig. 3 is a broken front elevation of the machine.

We have shown conventional plungers 31 (see Figs. 2 and 7) for pushing the matches 15 from the carrier, the plungers being carried by the cross bar 32 which can be actuated in any suitable way, or other ejecting means can be substituted.

Where the carrier is in the form of rigid sections as usual, no abutment is necessary behind the carrier and plungers, but where the belt is flexible as in our invention, it is necessary to support the carrier belt at the point of ejectment so as to give it the necessary rigidity. To this end we arrange a light framework 33 in front of the carrier and opposite the ejecting plungers, and this has members 34 spaced apart and entering between the several rows of matches so as to come in close contact with the carrier belt. Consequently when the plungers 31 advance to push out the matches, the members 34 hold the belt or carrier from buckling or displacement. Incidentally this arrangement of the members 34 and frame 33 affords a very simple means of holding the matches straight and guiding them in such a manner that they can be conveniently placed in trays 37. To this end we have shown a belt 35 running transversely across the front of the machine immediately below the members 34, this belt having clips 36 between which the match trays 37 can be placed, and the belt is carried by a pulley 38. It will be seen that this can be given a step by step movement in any usual or perferred way, the arrangement being such as to advance the trays 37 at the instant the plungers 31 are being withdrawn. Consequently when the plungers push out the matches they will drop, without any chance of becoming entangled, into the trays 37, and as the trays are advanced they will become filled.

Obviously the belt 35 can be timed so as to move just at the desired rate of speed, which will depend somewhat on the width of the belt 13.

While an arrangement like that just described to enter between the matches and serve as an abutment to the belt is necessary on a machine of this type, it will also be understood that such an arrangement can be applied to any usual form of carrier for the purpose of guiding the matches into the trays beneath.

While this machine lends itself to very cheap construction and to small units, employing a comparatively narrow belt of five or six inches in width, still it will be readily seen that it can be made of a capacity equal to that of the more ponderous and expensive machines.

Attention is again called to the fact that we have shown merely conventional means of placing splints in the carrier, but we wish it clearly understood that this has nothing to do with the invention, and that devices for cutting splints from blocks, veneer strips and other materials, and inserting the splints in the carrier, might be substituted for the conventional apparatus shown, without in the least affecting the principle of the invention.

We claim:—

1. In a match machine, a splint carrier comprising a flexible jointless belt having stick receiving holes transversely therethrough arranged to hold match sticks perpendicular to the carrier, and means for moving the belt longitudinally.

2. A match machine comprising a carrier consisting of a flexible jointless belt having stick receiving holes transversely therethrough arranged to hold match sticks in parallel relation perpendicular to the carrier, means for moving the belt or carrier longitudinally, means for inserting match sticks in the holes of the belt or carrier, and means for ejecting the matches from such holes.

3. In a continuous match machine, the carrier comprising a flexible jointless belt having rows of match stick receiving holes transversely therein to hold the match sticks perpendicular to the carrier, and means located near the edges of the belt for moving the belt longitudinally.

4. In a continuous match machine, the carrier comprising a flexible jointless belt having rows of eyelets inserted therethrough to receive the match sticks, combined with means for inserting such sticks and means for ejecting matches from the eyelets.

5. In a continuous match machine, the carrier comprising a flexible jointless non-metallic belt having match receiving holes therethrough, and reinforcing strips on the surface of the belt.

6. In a continuous match machine, the carrier comprising a flexible jointless non-metallic belt having match receiving holes therethrough, and reinforcing strips longitudinally of the belt.

7. In a continuous match machine, the carrier comprising a flexible jointless belt having match receiving holes therethrough, and holes near the edges of the belt to receive the teeth of driving sprocket wheels, and drive wheels having teeth to enter the holes, move the carrier, and hold the same in position to permit the insertion of match sticks and the ejection of matches.

8. In a continuous match machine, a carrier comprising a flexible jointless belt having match receiving holes transversely therethrough, said holes being arranged in rows and with holes near the edges of the belt and in alinement with the rows of match receiving holes, said holes at the edges being adapted to receive the teeth of driving sprocket wheels.

9. In a continuous match machine, a carrier comprising a jointless belt having match receiving holes therein, flexible reinforcing strips near the edges, and holes through the belt and through said reinforcing strips to engage the teeth of driving sprocket wheels.

10. A match machine comprising a jointless flexible belt having match stick receiving holes transversely therethrough to hold the sticks perpendicular to the belt forming a match carrier, means for inserting match sticks in and ejecting matches from the belt, and frameless guiding means for the belt comprising guide wheels spaced apart, and hangers to support the guide wheels.

11. In a machine of the kind described, the combination with the flexible carrier having match receiving holes transversely therein, of means for pushing matches out of said holes, and an abutment grid having parallel members entering between the rows of matches and with their ends adapted to abut with the carrier and stiffen the same against the thrust of the match ejecting mechanism.

12. In a machine of the kind described, the combination with the flexible carrier having match receiving holes transversely therein, of means for ejecting matches from said holes, an abutment grid having parallel members entering between the rows of matches with their ends arranged to abut with the carrier and stiffen the same against the thrust of the ejecting mechanism, and a tray carrying belt movable horizontally immediately below the said abutment members.

SAMUEL M. FRIEDE.
WARREN B. HUTCHINSON.

Witnesses:
M. G. O'Donnell,
Theron Davis.

Copies of this patent may be obtained for five cents each, by addressing the "Commissioner of Patents, Washington, D. C."